E. J. GULICK.
APPARATUS FOR CALIBRATING AND JUSTIFYING PARTS OF WIND MUSICAL INSTRUMENTS.
APPLICATION FILED JUNE 2, 1919.
1,389,348.
Patented Aug. 30, 1921.
3 SHEETS—SHEET 1.
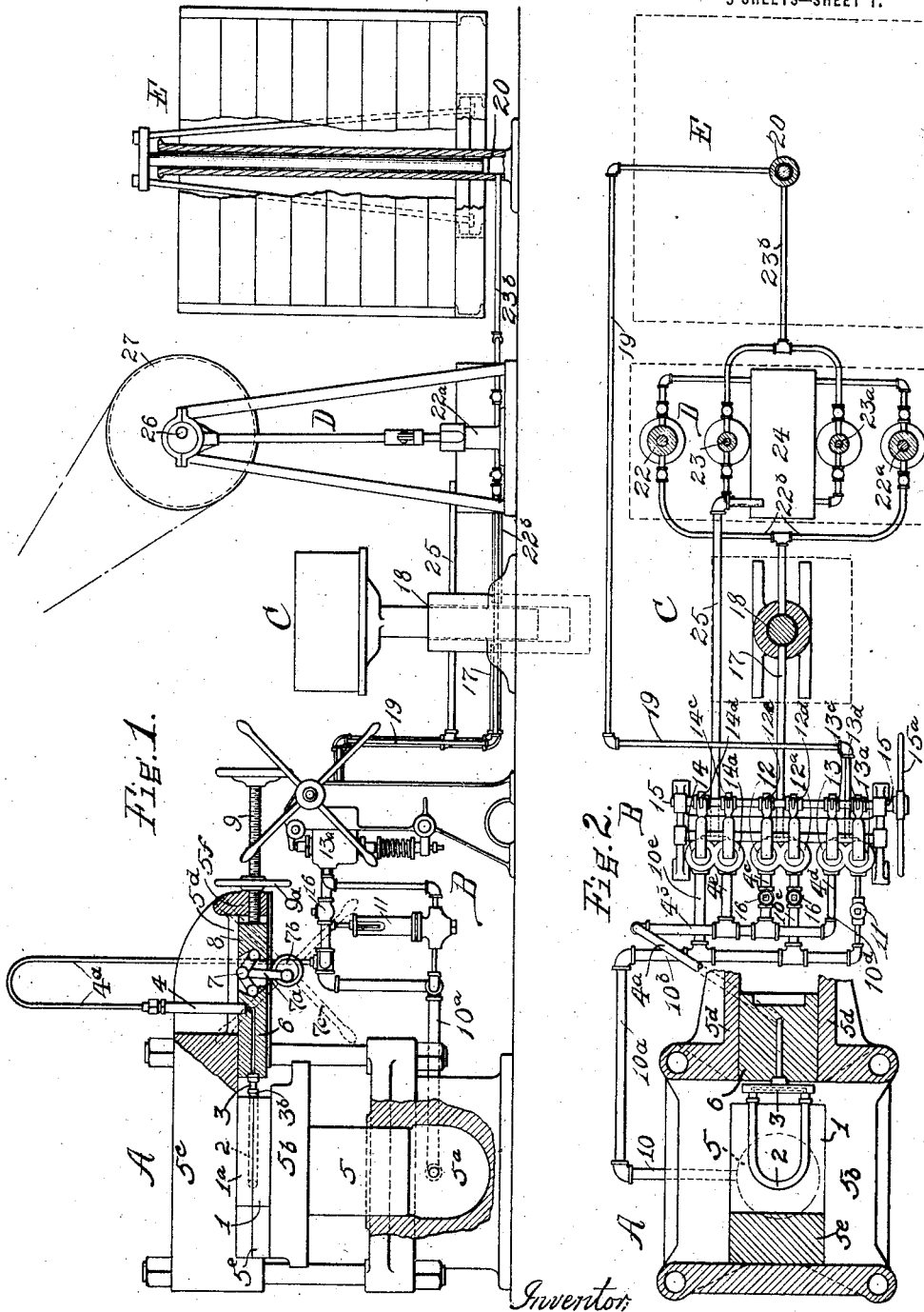
Inventor,
Edward J. Gulick
By Hervey S. Knight Atty.

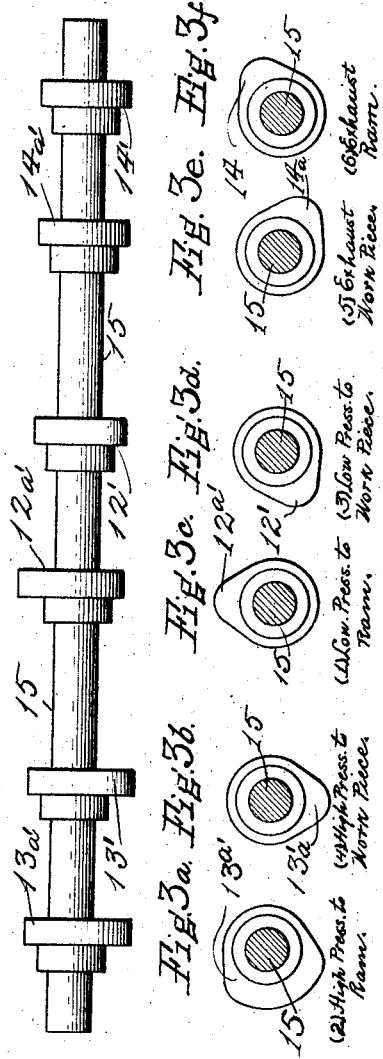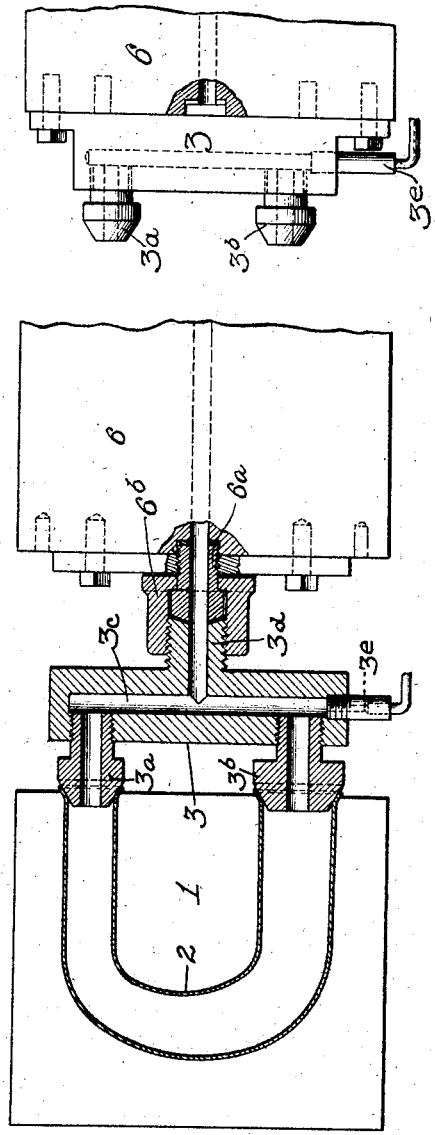

E. J. GULICK.
APPARATUS FOR CALIBRATING AND JUSTIFYING PARTS OF WIND MUSICAL INSTRUMENTS.
APPLICATION FILED JUNE 2, 1919.
1,389,348.
Patented Aug. 30, 1921.
3 SHEETS—SHEET 3.
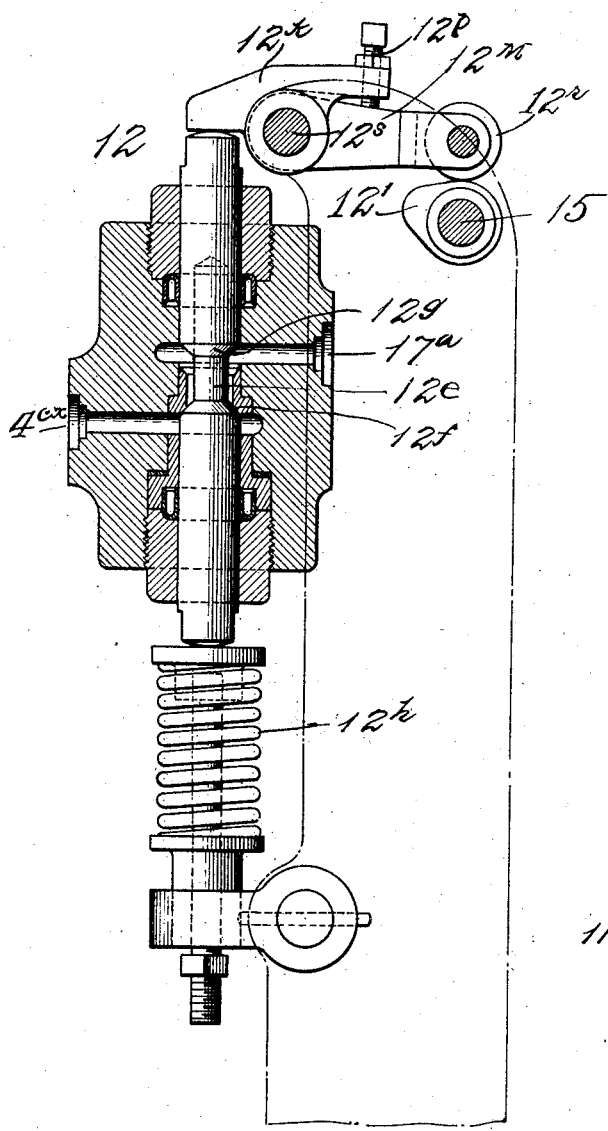
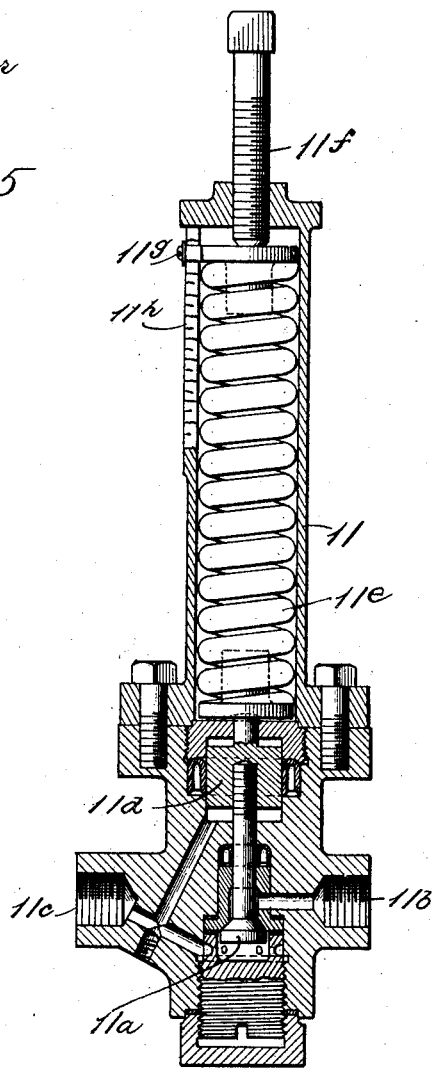
Inventor:
Edward J. Gulick,
By Hervey S. Knight
Atty.

UNITED STATES PATENT OFFICE.

EDWARD J. GULICK, OF ELKHART, INDIANA, ASSIGNOR TO C. G. CONN, LTD., OF ELKHART, INDIANA, A CORPORATION OF INDIANA.

APPARATUS FOR CALIBRATING AND JUSTIFYING PARTS OF WIND MUSICAL INSTRUMENTS.

1,389,348.     Specification of Letters Patent.     Patented Aug. 30, 1921.

Application filed June 2, 1919. Serial No. 301,211.

*To all whom it may concern:*

Be it known that I, EDWARD J. GULICK, a citizen of the United States, residing at Elkhart, in the county of Elkhart and State of Indiana, have invented certain new and useful Improvements in Apparatus for Calibrating and Justifying Parts of Wind Musical Instruments, of which the following is a specification.

In United States Letters Patent No. 1,110,629, issued January 2, 1917, a process of calibrating and justifying parts of wind musical instruments is described, according to which a tubular work-piece is calibrated and justified, and has the metal of which it is composed cold worked by first shaping it up to approximately conform to the shape, dimensions, and conditions ultimately desired, and then introducing it between the members of a mold formed to provide a cavity accurately conforming to the ultimate shape desired, and, while firmly clamping together the members of the mold and holding the ends of the work-piece, a fluid pressure is introduced into the bore of the work-piece under sufficient pressure to draw and stretch the metal of the work-piece, and give to its walls a permanent seat in close contact with the walls of the mold; and said patent illustrates a mold and means for introducing the fluid pressure to the work-piece therein, the latter being intended for connection with any suitable source of pressure medium supply.

The object of the present invention is to provide a machine for conveniently and rapidly performing the several steps of the process above described, including means such as a die molding press embodying a mold divided into two corresponding dies and a hydraulic ram for separating the dies of the mold for introduction and removal of the work-piece, and for bringing the dies together to close the mold and clamping them under a pressure adequate to resist the internal pressure to which the work-piece is to be subjected; fluid distributing mechanism including a pressure delivery block carrying a nozzle manifold and means for pressing it to and removing it from the bore of the work-piece; valves directing and controlling the supply of fluid medium to the conduits under two different stages of pressure, namely, a low pressure stage for moving the ram to close the mold and initially fill the work-piece, and a high pressure stage by which the ram is heavily loaded to resist pressure within the work-piece, and said work-piece is loaded with fluid under sufficient pressure to develop the ultimate stretching and straining of the metal thereof; a common cam shaft through which the valves are unseated in sequence and in the order of the functions to be developed by them; means introduced in the high pressure ram supply conduit to restrict the pressure imparted to the ram below that which is introduced into the work-piece; high and low pressure accumulators; and a pumping installation.

Further objects of the invention relate to the provision of suitable details in the construction of the apparatus, as will hereinafter appear.

The invention will be fully understood upon reference to the accompanying drawings, in which—

Figures 1 and 2 are, respectively, a side elevation and a plan view of the complete apparatus involving the several features of the present invention, some parts in each being shown in section.

Fig. 3 is a view of a master shaft through which to control a series of valves that determine the application and exhaust of pressure medium to the clamping member and to the dies containing the work-piece.

Figs. 3ª, 3ᵇ, 3ᶜ, 3ᵈ, 3ᵉ, and 3ᶠ are transverse sections of the shaft shown in Fig. 3 in planes adjacent the respective cams mounted thereon (six in number) through which the several valves are actuated, and by the relative angular positions of which the order in which the valves are opened, and therefore the sequence of the several steps in the supply and exhaust of the liquid, are determined.

Fig. 4 is a detail view showing one half of a mold containing the tubular work-piece (in section) with the pressure-delivering block and nozzle manifold in section.

Fig. 5 is a plan view showing a modified construction of parts shown in Fig. 4.

Fig. 6 is a detail view of one of the valves controlling the delivery of pressure medium to the conduits; and Fig. 7 is a detail view of the pressure-reducing valve which governs the pressure delivered to the ram conduit.

Referring to Figs. 1 and 2, the several groups of mechanism which together make up the complete system of apparatus are the hydraulic die press A, fluid distributing mechanism B, the low pressure accumulator C, the pressure-developing pumps D, and the high pressure accumulator E.

Hydraulic die press A.

1 and 1$^a$ represent the corresponding dies of a divided mold in which to shape an article, such, for instance, as the tubular crook or bend 2 which is to form part of a wind musical instrument. 3 represents a nozzle manifold through which pressure medium supplied by a pipe 4 is delivered to the interior of the work-piece 2, and which, as shown more clearly in Figs. 4 and 5, is provided with tapered nozzles 3$^a$, 3$^b$ which press the metal of the open ends of said work-piece against correspondingly tapered seats in the mold. The manifold 3 may be connected with block 6 through the medium of the shank 3$^d$ and nipple 6$^a$ connected by the union 6$^b$, as shown in Fig. 4, or it may be bolted directly to said block, as shown in Fig. 5.

The lower member 1 of the mold is carried by a ram 5 which reciprocates vertically in its cylinder 5$^a$, and is provided with a platen 5$^b$; the upper part of the mold 1$^a$ is carried by a fixed head 5$^c$. The members of the mold may thus be separated by the operation of the ram 5 for the purpose of introducing and removing the work-piece, and are held together during the operation of shaping by a pressure sufficient to resist internal pressure applied to the work-piece.

In order to present the nozzle member 3 to the dies with sufficient pressure to insure a liquid-tight connection and to remove it from the dies, it is mounted upon the pressure-delivery block 6, which is mounted to slide between cheeks 5$^d$ of the head 5$^c$ horizontally in the plane assumed by the dies when closed; the fluid pipe 4 being tapped into the block 6, and being fed through a flexible bend 4$^a$ in order to permit such movement. To operate the block 6 with the nozzle member 3 to and from the dies, toggle links 7 are interposed between the rear end of block 6 and the fulcrum block 8, and the knuckle of said toggle is connected by link 7$^a$ with an eccentric shaft 7$^b$, which is adapted to be manually rotated through the turnstile 7$^c$. The dies are sustained against pressure of the block 6 through means of block 5$^e$, and this block is made removable and replaceable with blocks of different horizontal dimension in order to accommodate dies of different sizes. Fulcrum block 8 is also made adjustable between the cheeks 5$^d$ of the head 5$^c$ in the plane of the mold 1, and is provided with adjusting screw 9 threaded in the bridge 5$^f$ between said cheeks.

Fluid distributing mechanism.

In addition to the flexible bend 4$^a$, pipe 4 has a manifold 4$^b$ with low pressure branch 4$^c$, high pressure branch 4$^d$, and exhaust branch 4$^e$. Ram 5 is fed through pipe line 10, 10$^a$, and manifold 10$^b$, which latter has low pressure branch 10$^c$, high pressure branch 10$^d$, and exhaust branch 10$^e$. In other words, the ram and die of the press are provided with connections through which they may be supplied initially with a low pressure for preliminarily loading the pressure surfaces and then with a high pressure for developing the full amount of pressure required; and each is provided with an exhaust connection through which pressure may be relieved after the operation is over. In order to control the flow of high and low pressure fluid, as well as exhaust fluid, through these several connections, three groups of valves are provided corresponding to the three conditions to be developed, with two valves in each group corresponding to the two pressure spaces to be served. In other words, there is a pair of low pressure valves 12, 12$^a$ controlling, respectively, low pressure branch 4$^c$ which feeds the dies and the low pressure branch 10$^c$ which feeds the ram; a pair of high pressure valves 13, 13$^a$, respectively, controlling the high pressure branch 4$^d$ of the dies and the high pressure branch 10$^d$ of the ram; and a pair of exhaust valves 14, 14$^a$, respectively, controlling the exhaust branch 4$^e$ of the dies and the exhaust branch 10$^e$ of the ram.

High pressure branch 10$^d$ of the ram is preferably provided with a pressure regulating valve 11 in order that the degree of pressure developed in the ram may be limited with relation to the degree of pressure delivered to the dies without necessitating the use of separate sources of pressure. A construction of regulating valve suitable for this purpose is illustrated in Fig. 7, according to which the valve head 11$^a$, which controls the passage of fluid from the pressure-supply port 11$^b$ to the port 11$^c$ which receives the branch 10$^d$, is pressed to its seat by piston 11$^d$, in opposition to spring 11$^e$ whenever the pressure in the branch 10$^d$, and therefore in the ram, has reached the desired degree; said valve being held off its seat by said spring at all times when the pressure is lower than the desired degree. Screw 11$^f$, located to load the spring 11$^e$ by depressing the seat of the spring, permits of adjustment of the valve to develop any degree of pressure desired within the limit of pressure of the source of supply, and the indicator $11^g$, carried by the spring seat, sliding over the graduations $11^h$ on the shell of the valve provides for calibration of the valve and reading of the pressure determined thereby. By using this valve, constant pressure is insured in the ram, since, if any leakage should occur beyond the port $11^c$, the reduced pressure under piston $11^d$ will at once allow spring $11^e$ to unseat the valve head $11^a$ and admit more pressure medium from the supply until the predetermined pressure is reestablished in the ram.

In order to control the valves 12, $12^a$, 13, $13^a$, and 14, $14^a$, and to properly coördinate their opening and closing movements to correspond with the sequence of functions to be established in the ram and dies, they are provided with a common valve shaft 15 (see Fig. 3) having a series of cams corresponding in number to the valves to be controlled, positioned on said shaft in a manner to actuate the valves in sequence, and each shaped to maintain opening of the valve which it controls for the particular unit of time, measured by the revolution of the shaft, that may be necessary to insure the functioning of the part which the pressure controls. As shown in Fig. 3, these cams bear the same reference characters as the several valves, modified by the prime mark, and they occupy the relative angular positions upon the shaft indicated by Figs. $3^a$, $3^b$, $3^c$, $3^d$, $3^e$, and $3^f$, the sections of the shaft in these figures being viewed on the side from which the cams appear to rotate clockwise. Thus the cams $12^{a\prime}$ and $12'$, respectively, control the low pressure valve of the ram and the low pressure valve of the dies; the cams $13^{a\prime}$ and $13'$, respectively, control the high pressure valve of the ram and the high pressure valve of the dies; and the cams $14^{a\prime}$ and $14'$, respectively, control the exhaust of the work-piece and the exhaust of the ram. From the positions of these cams it will be seen that the low pressure ram valve cam (Fig. $3^c$) reaches opening position first for the purpose of moving the ram up to the position shown in Fig. 1, and is followed by the high pressure ram valve cam (Fig. $3^a$) to put high pressure in the ram sufficient to resist pressure within the work-piece. The turnstile $7^c$ will now be operated to apply the nozzle member 3 to the dies. Then the cam $12'$ opens the low pressure die valve to fill the work-piece, the high pressure ram cam still continuing to hold its valve open to maintain high pressure under the ram. At this time the air valve $3^e$ (Figs. 4 and 5) will be opened temporarily to permit air to escape from the work-piece. Then follows the high pressure die valve cam to admit high pressure to the work-piece (the high pressure ram valve cam still continuing in action); then the high pressure die valve cam closes its valve, followed by the movement of high pressure ram valve cam away from its valve, the opening of the die exhaust valve to relieve pressure from within the work-piece, and the opening of the ram exhaust valve to permit the ram to descend and open the dies for removal of the work-piece.

A valve construction suitable for each of the valves 12 to $14^a$, as well as the relation of the controlling cam thereto, is shown in Fig. 6, according to which stem $12^e$, seating at $12^f$ under the action of a spring $12^h$ and thereby closing the valve against the flow of fluid from the supply port $17^a$ to the delivery port $4^c$, may be unseated by the adjustable lever $12^k$, $12^m$ with adjusting screw $12^p$, and fulcrumed at $12^s$ whenever the cam $12'$ passes beneath the roller $12^r$ of the valve lever. By the face $12^g$ opposing the seating face $12^f$ of the valve stem $12^e$, the valve is balanced under the pressure communicated through port $17^a$, so that its control is subject solely to spring $12^h$ and the unseating lever $12^k$, $12^m$.

16 represents check valves in the two low pressure branches leading, respectively, to the ram and to the dies, for the purpose of holding the pressure fluid in these elements of the apparatus until and during communication of high pressure thereto.

Low pressure accumulator.

Fluid pressure medium under low pressure is delivered to valves 12, $12^a$ by a pipe 17 which leads from an accumulator 18, portions of which are designed to deliver fluid to said pipe in volume and under pressure ample to fill the system including the ram and the work-piece, and initially load them so that the volume of fluid under high pressure that will be required will be relatively small. Similarly, fluid pressure medium under high pressure will be supplied to the valves 13, $13^a$ through a pipe 19 leading from the high pressure accumulator 20, which may be of known construction and which is designed to develop a pressure sufficient to expand the work-piece in the dies. This, with the disclosed design of ram, will be more than sufficient to hold the dies closed, for which reason the reducing valve 11 will be interposed between valve $13^a$ and the ram, as already described.

Pumping mechanism.

Fluid is stored in the high and low pressure accumulators preferably by a system of pumps, two pumps being preferably employed for each accumulator, for instance, pumps 22, $22^a$ for the accumulator 18, and pumps 23, $23^a$ for the accumulator 20. These pumps draw from a common tank 24, to which exhaust water is returned from valves 14, $14^a$ through a pipe 25, and these pumps are preferably actuated by a common eccentric shaft 26 driven by pulley 27, and upon which the separate cams for the respective pumps will be distributed in different angular positions in order to distribute the load at different points in the revolution and develop a more balanced resistance to the drive.

I claim:

1. In a hydraulic die-pressing system, the combination of a pair of separable dies adapted to receive and confine a work-piece between them, a die conduit adapted to supply fluid pressure medium to said dies, a holding press comprising a ram and a coacting head between which said dies are clamped, a conduit for supplying pressure medium to said ram, controlling valves connected to the respective conduits, a low pressure source and a high pressure source, each supplying both said conduits, and a pressure-reducing valve interposed between the ram conduit and the source of high pressure.

2. In a hydraulic die pressing system, the combination of separable dies for confining and shaping a work-piece, a die-conduit adapted to supply fluid pressure medium to said dies, a holding ram and a coacting head between which said dies are held, a conduit for supplying pressure medium to said holding ram, a pair of low pressure valves, a pair of high pressure valves and a pair of exhaust valves, the valves of each pair being connected to the respective conduits, a low pressure accumulator supplying the low pressure valves of each pair, and a high pressure accumulator supplying the high pressure valve of each pair.

3. In a hydraulic die pressing system, the combination of dies composed of separable members for confining and shaping a work-piece, a die conduit having a connecting block through which it supplies fluid pressure medium to said dies, a holding press for said dies comprising a ram and a coacting head upon which the respective die-members are mounted, a conduit for supplying pressure medium to said holding press, said connecting block being in the plane of the dies when together, a pair of low pressure valves, a pair of high pressure valves, and a pair of exhaust valves, the valves of each pair being connected to the respective conduits, a low pressure accumulator supplying both low pressure valves, and a high pressure accumulator supplying both high pressure valves.

4. In a hydraulic die pressing system, the combination of a low pressure accumulator, a high pressure accumulator, a die-holding press, work-shaping dies, valves connected respectively to transmit pressure medium from the low pressure accumulator to said ram and dies, to transmit pressure medium from the high pressure accumulator thereto, and to exhaust pressure medium therefrom, and mechanism actuating said valves in the order of their functions named.

5. In a hydraulic die pressing system, the combination of a low pressure accumulator, a high pressure accumulator, a die-holding ram, work-shaping dies, a pair of valves connected to transmit pressure medium from the low pressure accumulator respectively to the ram and dies, a pair of valves connected to transmit pressure medium from the high pressure accumulator respectively to said ram and dies, a pair of valves connected to exhaust pressure medium respectively from said ram and dies, and a common actuating mechanism for all of said valves acting upon the respective pairs in the order named, and the ram-controlling valve acting first in each pressure transmitting pair, but acting second in the pressure exhausting pair.

6. In a hydraulic die press, a ram having means for mounting a die member thereon, a head sustaining said die member against the pressure of said ram, and a fluid delivery block mounted on the sustaining head in the plane assumed by the die when arrested by the head and movable in said plane to and from said die; said die and delivery block having a connection established by such movement for conducting fluid pressure medium between them; and said delivery block having a toggle link controlling means.

7. In a hydraulic die press, a ram having means for mounting a die member thereon, a head sustaining said die member against the pressure of said ram, and a fluid delivery block mounted on the sustaining head in the plane assumed by the die when arrested by the head and movable in said plane to and from said die; said die and delivery block having a taper plug connection established by such movement for conducting fluid pressure medium between them; and said delivery block having a toggle link controlling means developing its thrust in the direction of said movement, and screw adjustment for said toggle link also in said direction.

8. In a hydraulic die press, a ram having means for mounting a die member thereon, a head sustaining said die member against the pressure of said ram, and a fluid delivery block mounted on the sustaining head in the plane assumed by the die when arrested by the head and movable in said plane to and from said die; said die and delivery block having a connection established by such movement for conducting fluid pressure medium between them; and said delivery block having a toggle link controlling means and an adjustable fulcrum block therefor.

9. In a hydraulic die press, a ram having means for mounting a die member thereon, a head sustaining said die member against the pressure of said ram, a fluid delivery block mounted on the sustaining head in the plane assumed by the die when arrested by the head and movable in said plane to and from said die; said die and delivery block having a connection established by such movement for conducting fluid pressure medium between them, and having a flexible bend fluid feed conduit.

10. In a hydraulic die press, a ram having means for mounting a die member thereon, a head sustaining said die member against the pressure of said ram, and a fluid delivery block mounted on the sustaining head in the plane assumed by the die when arrested by the head and movable in said plane to and from said die; said die and delivery block having a connection established by such movement for conducting fluid pressure medium between them; and said delivery block having a toggle link controlling means and an actuating shaft having a link connecting an eccentric point thereon with the knuckle of the toggle link.

Signed at Elkhart, Indiana, this 27th day of May, 1919.

EDWARD J. GULICK.